(12) United States Patent
Strutt et al.

(10) Patent No.: US 7,609,641 B2
(45) Date of Patent: Oct. 27, 2009

(54) SYSTEM AND METHOD FOR PROVIDING A CONGESTION-AWARE ROUTING METRIC FOR SELECTING A ROUTE BETWEEN NODES IN A MULTIHOPPING COMMUNICATION NETWORK

(75) Inventors: Guenael T. Strutt, Stanford, FL (US); Surong Zeng, Altamonte Springs, FL (US); Sebnem Z. Ozer, Altamonte Springs, FL (US); Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 568 days.

(21) Appl. No.: 11/268,102

(22) Filed: Nov. 7, 2005

(65) Prior Publication Data
US 2006/0109787 A1 May 25, 2006

Related U.S. Application Data (60) Provisional application No. 60/625,113, filed on Nov. 5, 2004.

(51) Int. Cl.
*G01R 31/08* (2006.01)
*H04W 4/00* (2006.01)

(52) U.S. Cl. ....................... 370/238; 370/338
(58) Field of Classification Search ................. 370/235, 370/237–238, 338, 401
See application file for complete search history.

(56) References Cited

U.S. PATENT DOCUMENTS

| | | | |
|---|---|---|---|
| 6,754,192 B2 | 6/2004 | Kennedy | |
| 6,791,949 B1 | 9/2004 | Ryu et al. | |
| 6,965,568 B1 * | 11/2005 | Larsen | 370/238 |
| 7,027,426 B2 * | 4/2006 | Billhartz | 370/338 |
| 7,281,057 B2 * | 10/2007 | Cain | 709/238 |
| 7,376,122 B2 * | 5/2008 | Draves et al. | 370/351 |
| 7,394,826 B2 * | 7/2008 | Cain et al. | 370/469 |
| 7,515,911 B2 * | 4/2009 | Ebata | 455/445 |
| 2002/0062388 A1 | 5/2002 | Ogier et al. | |

(Continued)

FOREIGN PATENT DOCUMENTS

CN      101057511      10/2007

(Continued)

OTHER PUBLICATIONS

EPC Search Opinion Application No. 05817572.0—10 pages.

(Continued)

*Primary Examiner*—Kwang B Yao
*Assistant Examiner*—Candal Elpenord
(74) *Attorney, Agent, or Firm*—Randi L. Karpinia (57) ABSTRACT

A system and method for calculating a routing metric that can select the route providing the best throughput in a multihopping network (100), based on one or more parameters including completion rates, data rates, MAC overhead and congestion. The system and method are capable of selecting a route in a multihopping network (100) having a high throughput, comprising calculating a routing metric at one or more nodes (102, 106, 107), wherein the routing metric enables the one or more nodes (102, 106, 107) to select the route in the network (100). The routing metric can include network information such as the raw data rate, the completion rate, and the media access control overhead and congestion.

19 Claims, 8 Drawing Sheets

U.S. PATENT DOCUMENTS

| | | | |
|---|---|---|---|
| 2002/0152299 A1 | 10/2002 | Traversat et al. | |
| 2003/0202476 A1 | 10/2003 | Billhartz et al. | |
| 2004/0100929 A1* | 5/2004 | Garcia-Luna-Aceves | 370/338 |
| 2004/0146007 A1 | 7/2004 | Saadawi et al. | |
| 2004/0156345 A1* | 8/2004 | Steer et al. | 370/338 |
| 2004/0157557 A1 | 8/2004 | Barnett et al. | |
| 2004/0219922 A1 | 11/2004 | Gage et al. | |
| 2004/0264466 A1* | 12/2004 | Huang | 370/392 |
| 2005/0089005 A1* | 4/2005 | Sakoda et al. | 370/348 |
| 2005/0286419 A1* | 12/2005 | Joshi et al. | 370/230 |
| 2005/0286426 A1* | 12/2005 | Padhye et al. | 370/238 |

FOREIGN PATENT DOCUMENTS

| | | |
|---|---|---|
| EP | 1808032 | 7/2007 |
| JP | 2008519533 | 6/2008 |
| KR | 100886060 | 2/2009 |
| WO | 2006052758 A2 | 5/2008 |

OTHER PUBLICATIONS

Jung et al.: A Correlated Load Aware Routing Protocol in Mobile AD HOC Networks—10 pages.

PCT International Search Report Application No. PCT/US05/40038 Dated Sep. 5, 2006—8 pages.

* cited by examiner

SYSTEM AND METHOD FOR PROVIDING A CONGESTION-AWARE ROUTING METRIC FOR SELECTING A ROUTE BETWEEN NODES IN A MULTIHOPPING COMMUNICATION NETWORK

This application claims the benefit of U.S. Provisional Application No. 60/625,113, filed Nov. 5, 2004 the entire content of which being incorporated herein by reference.

FIELD OF THE INVENTION

The present invention relates to wireless communication networks and, more particularly, to a system and method for calculating a routing metric for selecting a route providing the best throughput in a multihopping network.

BACKGROUND

In recent years, a type of mobile communications network known as an ad-hoc network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, now U.S. Pat. No. 7,072,650, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

Ad-hoc networks typically comprise a plurality of nodes that collectively define a path from a mobile client to a destination node, or another network node by way of one or more wireless network nodes. Generally, a "channel" is established from each node to another defining the path to the network access node, which, in turn, provides access to an external network, such as the Internet. The channel may also be from one node to another in the same network when the destination is a user associated with the node.

As can be appreciated from the nature of wireless "ad hoc" networks such as those discussed above, a careful assignment of frequencies and channels is important for minimizing interference between nodes using the same frequency or channels in a network, and for maximizing the performance and efficiency of the network. In this regard, traditional methods of frequency channel assignment become difficult, for example, when only a small number of channels are available. Moreover, frequency channel assignments become difficult when the number of nodes exceeds the number of available channels.

Several techniques exist which address frequency channel assignment in the context of wireless "ad-hoc" networks. U.S. Patent Application 2004/0157613, for example, discloses a method for reducing co-channel and adjacent channel interference via self-selection of Radio Frequency Channels. Moreover, a publication by DeCouto et al. entitled "A High-Throughput Path Metric for Multihop Wireless Routing," M.I.T. Computer Science and Artificial Intelligence Laboratory, 2003, discloses an expected transition count (ETX) metric which identifies a relationship that is inversely proportional to the packet completion rate, but it does not account for variable data rates or signaling overhead.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to calculating a routing metric that can select the route providing the best throughput in a multihopping network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom; and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for calculating a routing metric that can select the route providing the best throughput in a multihop network as described herein. The non-processor circuits may include, but are not limited to, a radio receiver, a radio transmitter, signal drivers, clock circuits, power source circuits, and user input devices. As such, these functions may be interpreted as steps of a method for calculating a routing metric that can select the route providing the best throughput in a multihopping network Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the embodiments of the present invention described herein provide a system and method for calculating a routing metric that can select the route providing the best throughput in a multihopping network, based on one or more parameters including completion rates, data rates, media access control (MAC) overhead and congestion. The system and method are capable of selecting a route in a multihopping network having a high throughput, comprising calculating a routing metric at one or more nodes, wherein the routing metric enables the one or more nodes to select the route in the network. The routing metric can include network information such as the raw data rate, the completion rate, and the media access control (MAC) overhead and congestion.

Figure 1:
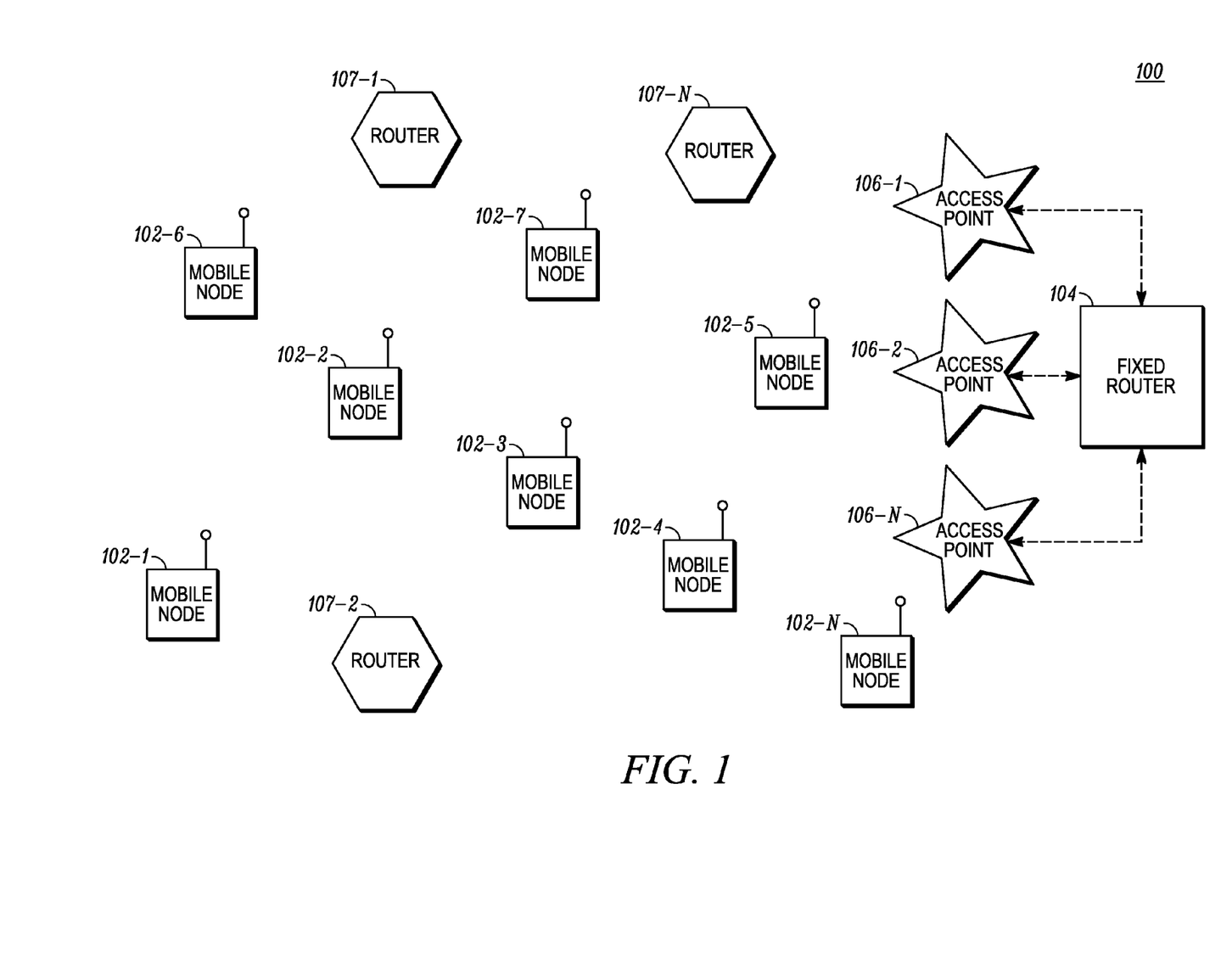
FIG. 1 is a block diagram of an example ad-hoc wireless communications network including a plurality of nodes employing a system and method in accordance with an embodiment of the present invention.

FIG. 1 is a block diagram illustrating an example of an ad-hoc wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106, access points (APs) 106 or intelligent access points (IAPs) 106), for providing nodes 102 with access to the fixed network 104. The fixed network 104 can include, for example, a core local area network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, wireless routers (WRs) 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165 and 6,873,839, referenced above.

Figure 2:
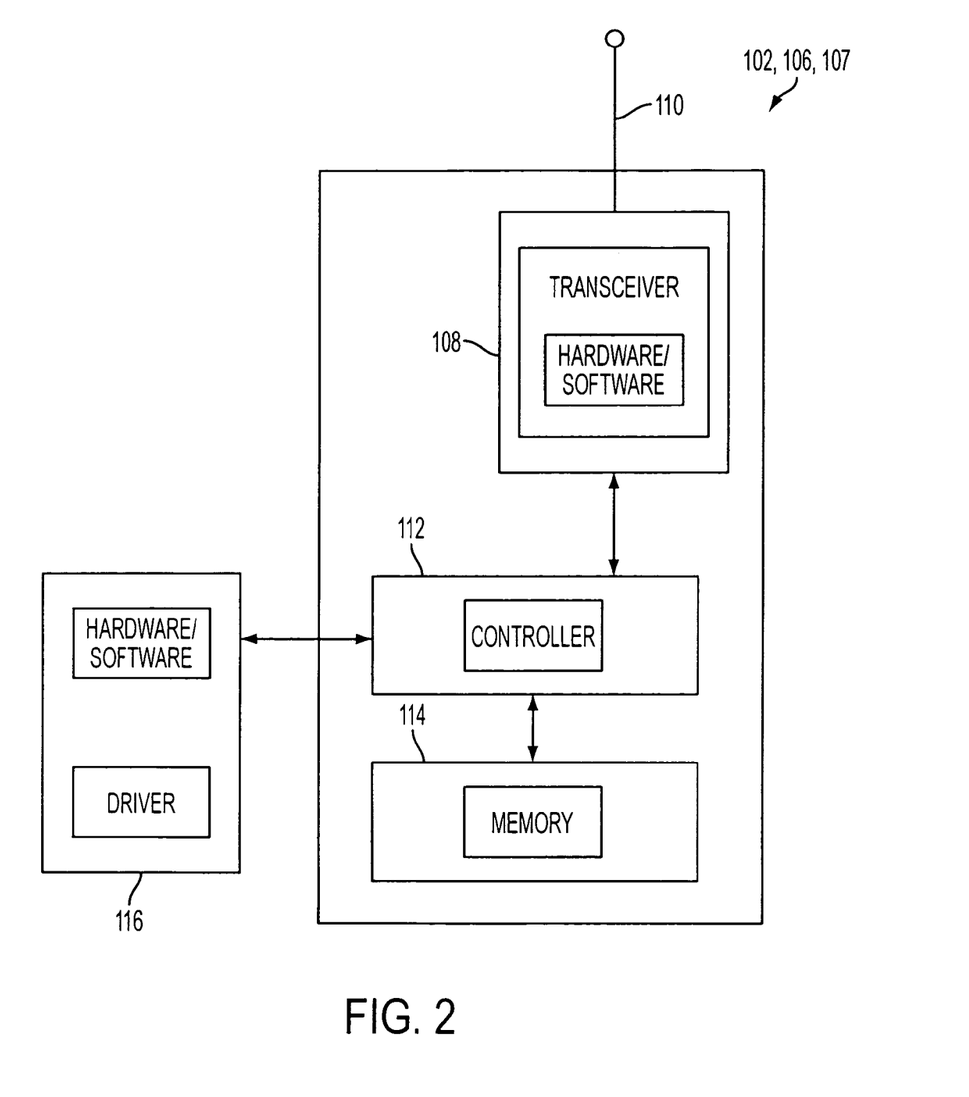
FIG. 2 is a block diagram illustrating an example of a mobile node employed in the network shown in FIG. 1.

As shown in FIG. 2, each node 102, 106 and 107 includes at least one transceiver or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As discussed above, it is desirable for the nodes 102, 106 and 107 of the network 100 to be capable of selecting a route in a multihop network that takes into account network congestion and which ensures optimum throughput. As will now be described, an embodiment of the present invention enables one or more nodes to calculate a routing metric that can select the route providing the best throughput, based on one or more parameters including completion rates, data rates, MAC overheard and congestion. It is noted that the routing metric can be calculated by the controller 112 and its associated hardware and software in the nodes 102, 106 and 107.

Congestion/Contention:

For a single channel Media Access Control (MAC), the contention time can be measured by the node 102, 106 or 107, either via counters, such as network allocation vector (NAV) or clear channel assessment (CCA), or via timestamps. For a multi channel MAC, the node 102, 106 or 107 can base its measurement on what it is able to monitor while listening to the reservation channel. The premise of the congestion/contention measurement is to enable an node 102, 106 or 107 to assess the percentage of the channel that is available for transmission at a given time. For example, if no portion of the bandwidth is being used by the node 102, 106 or 107 or another node 102, 106 or 107, then the bandwidth availability is 100% (one hundred percent). If another node 102, 106 or 107 is using the bandwidth, the availability can be any value between 50% (fifty percent) and close to 100% (one hundred percent). The availability, in this regard, is not lower than 1/N, where N is the number of nodes 102, 106 and 107 accessing the channel. This ensures that if the bandwidth is currently all being used, the bandwidth can still be shared by multiple users at a later time. Bandwidth does not necessarily have to be distributed equally among nodes 102, 106 or 107 (although it is in the previous examples). For example, specific nodes 102, 106 or 107 can be assigned a higher priority status or certain traffic flows can be assigned higher bandwidth requirements.

Figure 3:
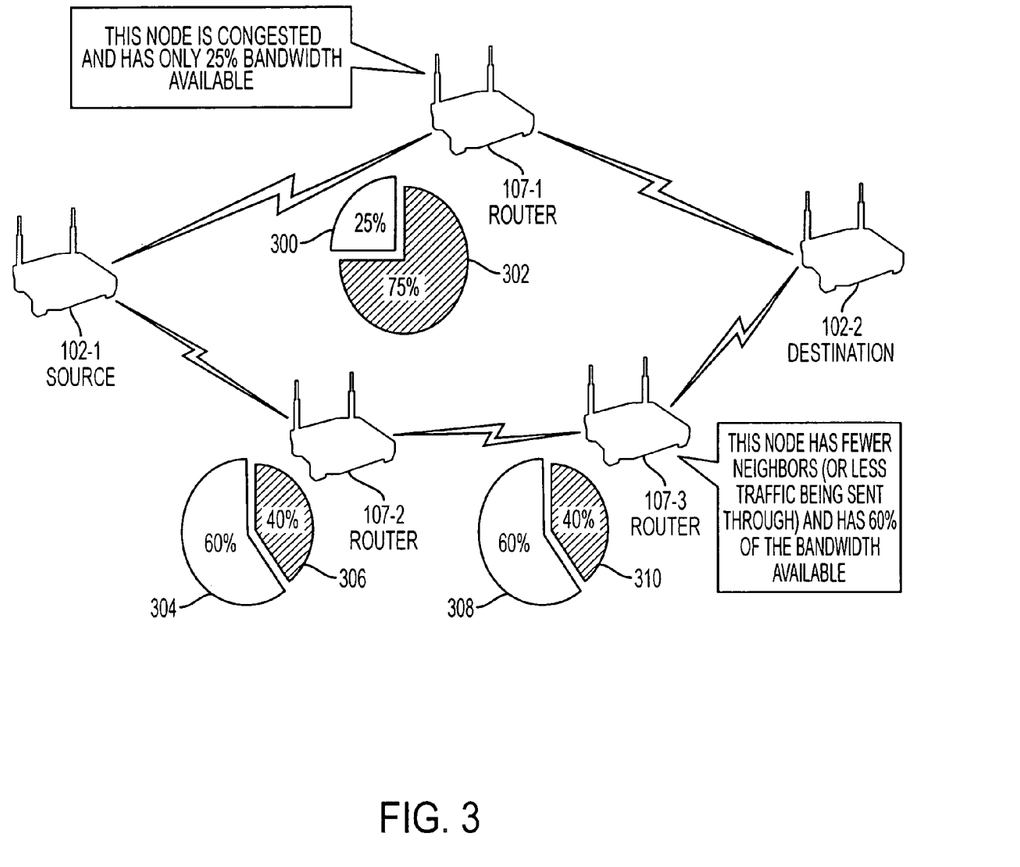
FIG. 3 is a diagram illustrating a congested multihopping wireless network, in which various routes have disparate bandwidth availabilities.

Assuming that all data rates are equal, all completion rates are 100% (one hundred percent) and ignoring signaling overhead, FIG. 3 illustrates a routing decision using congestion as part of the routing metric. It is noted that the source, the destination and the routers shown correspond to any node of the network 100, that is, mobile nodes 102, fixed routers 107, or access points 106, for example, as showing in FIG. 1. For purposes of this discussion, we will assume that the source and destination are nodes 102-1 and 102-2, respectively, and the routers are routers 107-1, 107-2 and 107-3. In this example, references 300, 304 and 308 indicate available bandwidth, and references 302, 306 and 310 indicate unavailable bandwidth. As indicated, node 107-1 is congestion and has only 25% (twenty five percent) bandwidth available, while nodes 107-2 and 107-3 are less congested and each have 60% (sixty percent) available bandwidth.

A routing metric for use in determining routing is generally defined as "the amount of time required to send a unit of information". It will be appreciated by those of ordinary skill in the art that the routing metric is proportional to the inverse of the effective throughput. In the following examples, a unit of time is in seconds and a reference unit of information is a Gigabit. It will be appreciated that other reference units of information and other units of time can be utilized in accordance with the present invention. If a link with no contention (i.e. availability is one hundred percent (100%)) has a throughput of ten (10) mega bits per second (Mbps), then a gigabit of information takes one hundred (100) seconds to be sent. One hundred (100) is therefore the routing metric for that particular reference link for the exemplary system. If the channel is sixty percent (60%) available, then the maximum throughput is six (6) Mbps, whereas a channel twenty five percent (25%) available will yield two point five (2.5) Mbps of throughput. At six (6) Mbps, it takes one hundred sixty six (166) seconds to send a gigabit of information. At two point five (2.5) Mbps, it takes four hundred (400) seconds to send a gigabit of information. Referring to the example shown in FIG. 3, the route consisting of nodes 102-1, 107-1 and 102-2 has a cumulative routing metric of eight hundred (800) (since both source node 102-1 and router 107-1 share the same medium, it takes eight hundred (800) seconds to send a gigabit of information). The route consisting of nodes 102-1, 107-2, 107-3 and 102-2 has a cumulative routing metric of five hundred (500).

Figure 4:
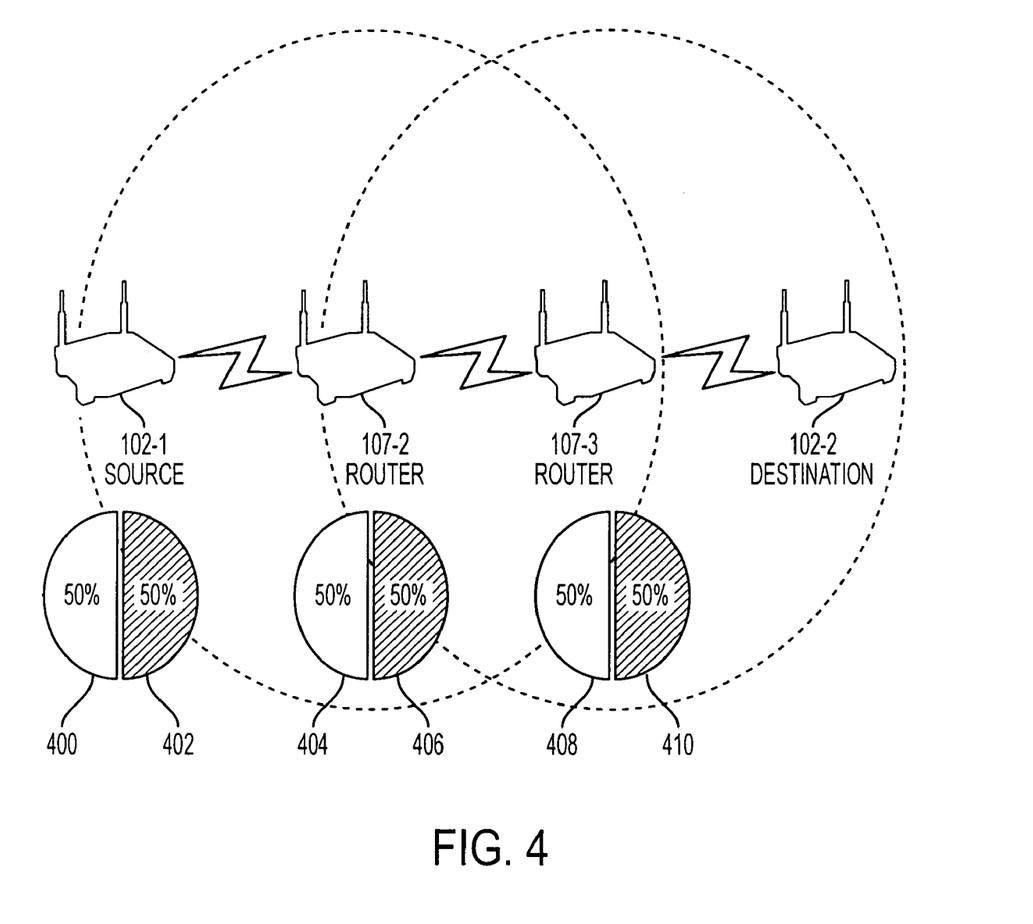
FIG. 4 is a diagram illustrating a multihopping wireless network, in which the first and third hops are used concurrently.
Figure 5:
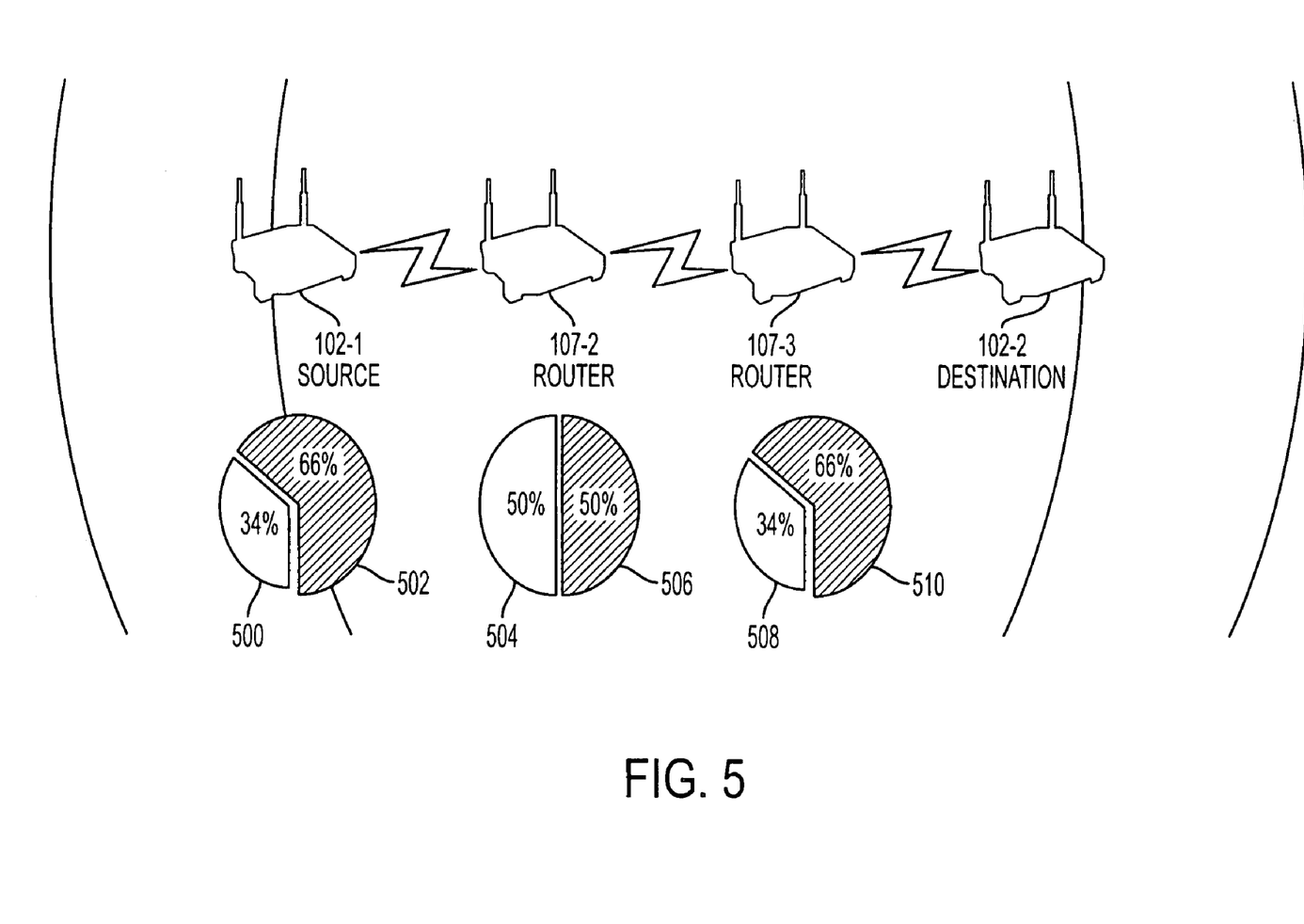
FIG. 5 is a diagram illustrating a multihopping wireless network, in which the first and third hops are not used concurrently, and wherein the throughput decreases.

Pipelining:

In the previous example shown in FIG. 3, it is not yet determined whether communication in the first hop between nodes 102-1 and 107-2 and communication in the third hop between nodes 107-3 and 102-2 can occur concurrently. In the event that they can occur concurrently, the routing metric can automatically take this fact into account by allotting more bandwidth to the communication as shown in FIG. 4. In this event, nodes 102-1, 107-1 and 107-2 collectively are allotted fifty percent (50%) of the available bandwidth, as indicated by 400, 404 and 408, while fifty percent (50%) of the bandwidth remains unavailable as indicated by 402, 406 and 410. If they cannot communicate concurrently, then the routing metric can reflect this and the amount of data that is transmitted, and thus the throughput, will decrease as shown in FIG. 5. That is, nodes 102-1 and 107-2 each are allotted thirty four percent (34%) of the available bandwidth, as indicated by 500 and 508, while sixty six percent (66%) of their bandwidth remains unavailable as indicted by 502 and 510, and node 107-1 is allocated fifty percent (50%) of the bandwidth as indicated by 504 while fifty percent (50%) of the bandwidth remains unavailable as indicated by 506.

Figure 6:
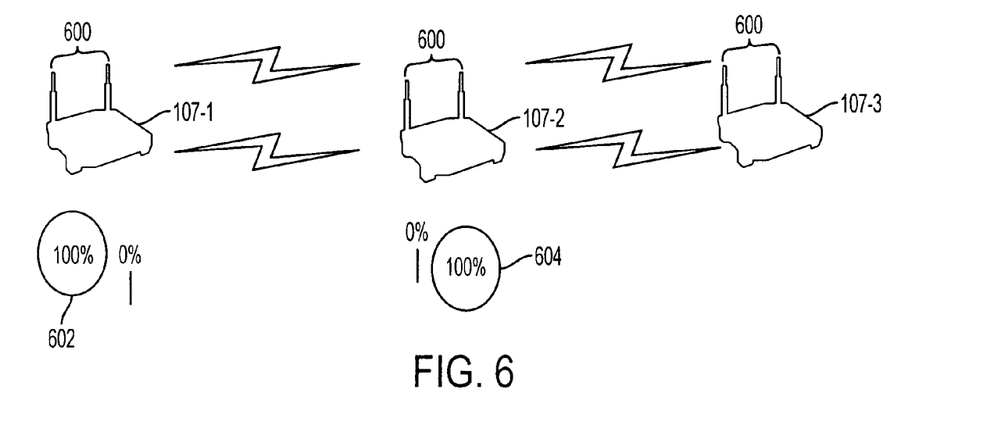
FIG. 6 is a diagram illustrating a network comprising a linear series of dual-transceiver routers, wherein each router is not in contention with any other router and no other flows of traffic originate along the route.
Figure 7:
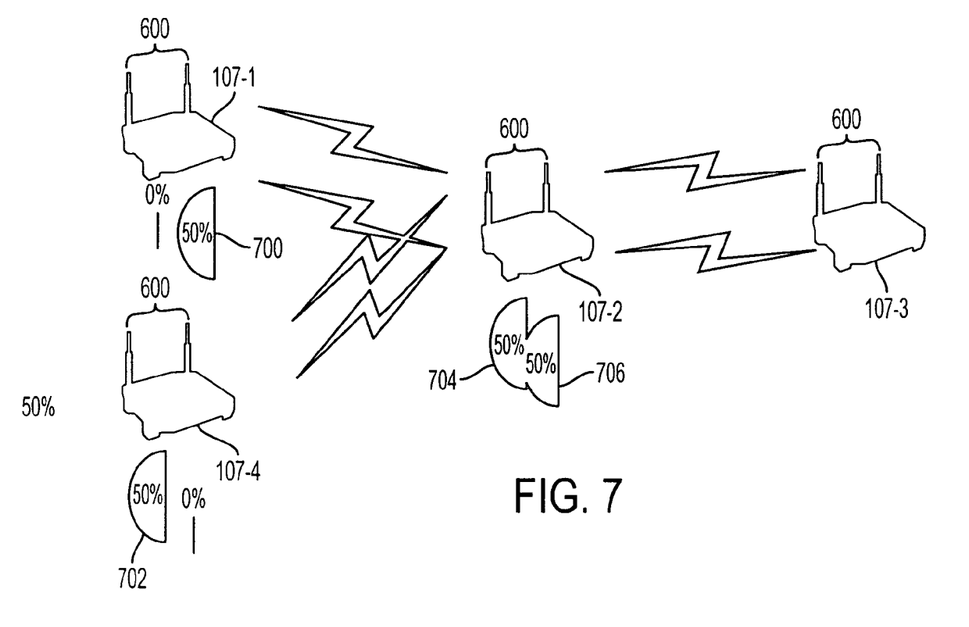
FIG. 7 is a diagram illustrating a congested multi-transceiver network, wherein contention amongst routers and traffic sources exists.

Multi-Transceiver:

As shown in FIG. 6, each router 107-1, 107-2 and 107-3 can include a dual-transceiver backhaul 600 comprising two transceivers 108 as shown in FIG. 2, for example, allows each router (e.g., routers 107-1, 107-2 and 107-3 as shown in FIG. 6) to be used as a transmitter and a receiver at the same time, thus doubling the bandwidth of the communication link. This occurs, however, if each router is not in contention with any other router and if no other flows of traffic originate along the route, as further shown as one hundred percent (100%) capacity designated by 602 and 604 in FIG. 6. Nevertheless, the routing metric can be used to address both situations successfully. Indeed, if the topology is a linear series of dual-transceiver routers 107-1, 107-2 and 107-3, then the link with the smallest contention at each router can be the one that is not being used for the previous hops. Therefore, the route can alternatively use one transceiver and then the other. If there is contention with other routers or traffic sources (e.g., another router 107-4) as shown in FIG. 7, the system can ensure that each transceiver is used equally, that is, the amount of bandwidth that is being used (which determines the final routing metric) is the same or substantially the same for each transceiver. In the example of FIG. 7, a transceiver of each router 107-1 and 107-4 uses fifty percent (50%) capacity as indicated by 700 and 702, and each transceiver of router 107-2 uses fifty percent (50%) capacity as indicated by 704 and 706.

TDMA:

In TDMA MAC's, the percentage of the bandwidth that is made available to a particular link is determined based on the ratio of the allotted time slot size to the total frame size that is being transmitted over that link.

Transmit Time of a Unit of Information:

During the available time described in the previous section, the node may be only capable of transmitting a limited amount of information. The routing metric is defined as the "amount of time required to send a unit of information", this time is therefore based on the data rate. Other parameters can come into play, such as MAC overhead and number of retries. Indeed, these other parameters can increase the actual time needed to send a unit of information, as shown in the graph 800 in FIG. 8, which illustrates an example of the amount of time occupied by request-to-send (RTS) and clear-to-send (CTS) messages, headers, data messages (DATA), and acknowledgement (ACK) and non-acknowledgement (NACK) messages.

Figure 8:
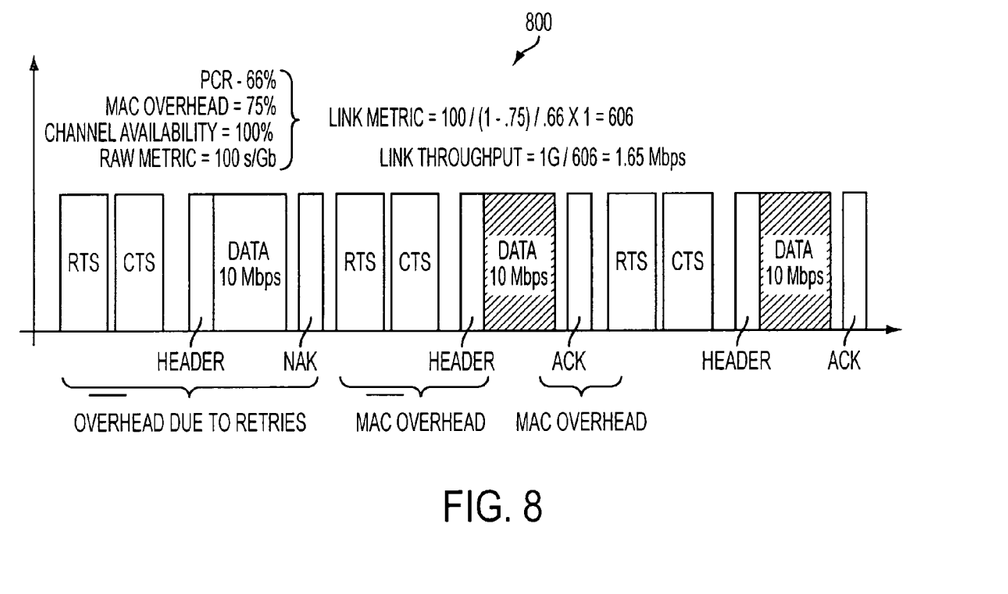
FIG. 8 is a diagram illustrating an example of a routing metric calculated for a particular link based on data rate, overhead and retries on that link according to an embodiment of the present invention.

In this example, the channel availability is one hundred percent (100%), which means there is no other node 102, 106 or 107 attempting to use the channel. Knowing the raw data rate, the MAC overhead and the completion rate, it is possible to determine the actual throughput and, therefore, the routing metric for a particular link. The data rate can be calculated as described in U.S. Patent Publication No. US20050286440A1, published on Dec. 29, 2005, entitled "System and Method for Adaptive Rate Selection for Wireless Networks." The MAC overhead can be provided as described in U.S. Patent Publication No. US20060034233A1, published on Feb. 16, 2006, entitled "Software Architecture and Hardware Abstraction Layer for Multi-Radio Routing and Method for Providing the Same." The completion rate can be calculated as described in U.S. Pat. No. 7,412,241, granted Aug. 12, 2008, entitled "A Method to Provide a Measure of Link Reliability to a Routing Protocol in an Ad Hoc Wireless Network." The entire contents of each of these three patent applications are incorporated by reference herein.

Routing Metric Example:

The following section presents an example routing metric that depends on the effective throughput per link. In particular, packet delay per hop can be approximated according to the following equation:

$$T_d = t_w + \sum_{i=1}^{\infty} (1 - pcr(L, R))^{i-1} pcr(L, R)(it_s(L, R) + (i-1)t_e)$$

$$= t_w + \frac{t_s(L, R) + (1 - pcr(L, R))t_e}{pcr(L, R)}$$

L=packet length
R=data rate
pcr=packet completion rate
$t_s$=transmission time of a packet (that includes overhead, propagation time, processing time etc)
$t_e$=extra time required for retransmission of a failed packet (that includes channel access time)
$t_w$=time elapsed between the packet arrival to the node's queue and this packet's first transmission attempt.

For example, for a contention based MAC protocol, the channel access time can depend on the neighborhood congestion and channel busy-ness. For a contention free system (e.g. TDMA system), it can depend on the slots allocated for the node/link. $t_e$ depends on the average backoff time due to the transmission failure and the neighborhood congestion (assuming that if a packet fails, it can be the first packet to be transmitted next time the channel is available). $t_w$ depends on the node's congestion level (e.g. the packets already queued in the node) and neighborhood congestion.

The effective throughput can be approximated as:

$$G = L/T_d = \frac{Lpcr(L, R)}{t_s(L, R) + (1 - pcr(L, R))t_e + pcr(L, R)t_w}$$

The values used to compute G can be measured as a moving average where the window size can be optimized to provide stability. Some of the values may be evaluated by using the measurement actions defined in the Institute of Electrical and Electronic Engineers (IEEE) 802.11 Standards. For example, for an IEEE 802.11 Standard network, $t_e$ can be estimated by using clear channel assessment (CCA) and network allocation vector (NAV) busy times as described in the IEEE 802.11h Standard and the IEEE 802.11k Standard, respectively.

The routing metric for each hop is:

$$M = \alpha/G$$

where α is a normalization factor. The variable α is selected to obtain a routing metric of "1" for a reference high-speed link, such as 1 Gbps. This ensures that all routing metrics in the network can be represented using integer values with a constrained (e.g. 16-bit) resolution.

Data Rate Dependency and Heterogeneous Transceivers:

The ability to base the routing metric on the amount of time taken to send a unit of information allows the routing protocol to operate with transceivers with a large span of data rates, such as those according to IEEE Standards 802.11a and 802.11g, or with multiple physical layers attaining different data rates (such as Ethernet versus Bluetooth). The only limitations are set by the reference routing metric (which in this example is set to one (1) Gigabit per second) and the metric resolution ($2^8$ corresponding to a three point nine (3.9) Mbps link and $\frac{1}{2}^{16}$ corresponding to fifteen (15) Kilobits per second (Kbps)). With a reference routing metric of one (1) Gigabit per second and a sixteen (16) bit resolution for the routing metric, it is possible to compare multihop throughputs on links as diverse as dial-up modems and Gigabit Ethernet.

Route Request Expiration for Protocols that Require Network Flooding:

If the routing protocol requires the network to be flooded (such as Route Requests in Ad-hoc On-demand Distance Vector (AODV) typically flooding is limited by using a TTL (time to live) limit. This severely limits the number of nodes 102, 106 or 107 the Route Request can reach without assuring that the high-speed backbone links are being fully used. Typically, a node will perform an expanding ring search if it is not able to find its destination with a small TLL. If the limit is based on the accumulated routing metric (instead of the TTL), then flooding will be interrupted as the Route Requests go through slower links and nodes 102, 106 or 107 that are congested; flooding will remain active through faster links and nodes 102, 106 or 107 that have little congestion. This allows for the routing protocol to more efficiently search for routes in a network, by allowing it to perform its route search based on the performance of the nodes 102, 106 or 107 that are being traversed.

Connectivity/Performance Indicator for Rapid Sensor Network Deployments:

Sensor network deployments require as little manual intervention as possible (no set-up interface) and there is typically no radio frequency (RF) coverage survey. Typical network connectivity indicators show the signal strength to the access point which the nodes 102, 106 or 107 are associated with. This may not take into account the actual link performance (the maximum data rate may be low) or the number of hops (i.e., the access point might be several hops away from the actual destination). The routing metric described herein may allow for performance comparisons to be made regardless of the number of hops. A visual indicator, for example a numeric indicator using a light emitting diode (LED) screen or a level indicator using multiple LEDs can be used for rapid deployment. That is, the node 102, 106 or 107 can tell the operator in real time if network performance at a particular location is acceptable or not. As understood in the art, a network 100 is generally self-configurable and should require only minimal user intervention, such as deploying the nodes (e.g., access points 106 and wireless router 107) and assuring that the deployed nodes 106 and 107 have a power source such as line current, a battery, a solar cell, and so on.

QoS Extensions:

The example routing metric can be differentiated if the route request includes the priority level of the flow for which the route is requested. For this purpose, one or more nodes preferably keep track of two types of priority information:
1. The Average Priority Levels of the Packets in the Node's Queue for a Given Time Period:

Depending on the scheduler (e.g. round robin or packet tagging based scheduler), each priority can be mapped to a queue level that has a certain allocated percentage for transmission attempts. For example, in this case $t_w$ can depend on the priority level. For a higher priority flow, $t_w$ will be smaller.

2. The Average Priority Levels of the Packets in the Node's Neighborhood for a Given Time Period:

For example, IEEE Standard 802.11e uses different channel access probabilities for different priority levels. If a node has the information on the priority levels of the packets that are being transmitted in the neighborhood, an estimation on the $t_w$ and $t_e$ can be done according to the relative priority levels of the flow and the neighborhood traffic. If the flow's priority level is much higher than the neighborhood traffic, $t_w$ and $t_e$ will be smaller.

Carrier Sensed Multiple Access with Collision Avoidance (CSMA/CA) Extensions:

The packet completion rate defined in the packet hop delay equation corresponds to the data packet completion rate. In systems using a CSMA/CA medium access controller, some of the contention frames (i.e., RTS and CTS) may also fail to be successfully transmitted. These failures affects the link throughput by increasing $t_e$. Using the RTS packet completion rate and making $t_e$ dependent on this completion rate will improve the accuracy of the routing metric.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of operation of a node for routing data in a wireless network, the method comprising:

for one or more routes from the node to another node:
determining information pertaining to transmission of a packet, the information comprising a packet length, a data rate, a packet completion rate, a transmission time of the packet, an additional time for retransmission of a failed packet, and a time elapsed between arrival of a received packet at the node and a first attempt at transmission of a packet by the node in response to the received packet, and calculating a routing metric based on the determined information; and selecting a route having a best routing metric for communication of at least one subsequent packet from the node to the another node.

2. A method as claimed in claim 1, further comprising:
operating the node to allocate an amount of bandwidth for transmission of the subsequent packet based on the routing metric of the selected route.

3. A method as claimed in claim 2, further comprising:
operating the node to transmit a plurality of said subsequent packets to achieve a level of throughput based on the amount of bandwidth allocated for transmission.

4. A method as claimed in claim 1, further comprising:
operating the node to determine the another node to which to transmit the subsequent packet based on the routing metric.

5. A method as claimed in claim 1, further comprising:
performing the determining step for a plurality of nodes in the network; and
calculating the routing metric based on the respective information determined at each of the plurality of nodes.

6. A method as claimed in claim 1, further comprising:
operating the node to provide information pertaining to the routing metric.

7. A node, operating within a wireless communication network, the node comprising:
a transceiver, operating to transmit and receive packets; and
a controller, operating to:
determine information pertaining to transmission of a packet each of one or more routes from the node to another node, the information comprising a packet length, a data rate, a packet completion rate, a transmission time of the packet, an additional time for retransmission of a failed packet by the transceiver, and a time elapsed between arrival of a received packet at the transceiver and a first attempt at transmission of a packet by the transceiver in response to the received packet,
calculate a routing metric based on the determined information for each of the one or more routes, and
select a route having a best routing metric for communication of at least one subsequent packet.

8. A node as claimed in claim 7, wherein:
the controller further allocates an amount of bandwidth for transmission of the subsequent packet based on the routing metric of the selected route.

9. A node as claimed in claim 8, wherein:
the controller further controls the transceiver to transmit a plurality of said subsequent packets to achieve a level of throughput based on the amount of bandwidth allocated for transmission.

10. A node as claimed in claim 7, wherein:
the controller further determines the another node to which to control the transceiver to transmit the subsequent packet based on the routing metric of the selected route.

11. A node as claimed in claim 7, wherein:
the controller further calculates the routing metric based on the determined information and information pertaining to the routing metric received from a plurality of other nodes in the network.

12. A node as claimed in claim 7, wherein:
the controller further controls the node to provide information pertaining to the routing metric.

13. A node as claimed in claim 7, wherein:
the controller further controls the transceiver to transmit information pertaining to the routing metric for receipt by at least one other node in the network.

14. A method for communicating in a wireless communication network, the method comprising:

operating a plurality of nodes, communicating in the wireless network, to each determine respective information comprising a packet length, a data rate, a packet completion rate, a transmission time of a packet, an additional time for retransmission of a failed packet, and a time elapsed between arrival of a received packet and a first attempt at transmission of a packet by the node in response to the received packet;

operating the plurality of nodes to transmit their respective information for receipt by other nodes; and operating each of the plurality of nodes to calculate a respective routing metric based on their respective information and the information received from the other nodes.

15. A method as claimed in claim 14, further comprising:

operating each of the nodes to allocate a respective amount of bandwidth for transmission of the subsequent packet based on their respective calculated routing metric.

16. A method claimed in claim 15, further comprising:

operating each of the nodes to transmit a respective plurality of subsequent packets to achieve a respective level of throughput based on their respective amount of bandwidth allocated for transmission.

17. A method as claimed in claim 14, further comprising:

operating each of the nodes to determine to which other node to transmit their respective subsequent packet based on their respective routing metric.

18. A method for providing a congestion-aware routing metric for selecting a route between nodes in a multihopping communication network, the method comprising:

calculating an associated routing metric for each of a plurality of routes between a source node and a destination node based on one or more parameters including a completion rate, a data rates, a media access control (MAC) overhead and a congestion, wherein one or more of the plurality of routes comprise a multihop route, and further wherein the associated routing metric of the multihop route comprises a cumulative routing metric calculated using an individual routing metric of each of a plurality of hops within the multihopping route;

selecting a route for communication between the source node and the destination node with the best associated routing metric;

determining whether communication in one hop of the multihop route and communication in another hop of the multihop route can occur concurrently;

allotting more bandwidth along the multihop route when the communications can occur concurrently; and decreasing the throughput along the multihop route when the communications cannot occur concurrently.

19. A method for providing a congestion-aware routing metric for selecting a route between nodes in a multihopping communication network, the method comprising:

calculating an associated routing metric for each of a plurality of routes between a source node and a destination node based on one or more parameters including a completion rate, a data rates, a media access control (MAC) overhead and a congestion, wherein the calculating the associated routing metric for each of a plurality of routes between a source node and a destination node further is based on a transmission time of a packet, an extra time required for retransmission of a failed packet, a time elapsed between the packet arrival to the node's queue and this packet's first transmission attempt; and selecting a route for communication between the source node and the destination node with the best associated routing metric.

* * * * *

UNITED STATES PATENT AND TRADEMARK OFFICE
CERTIFICATE OF CORRECTION

PATENT NO. : 7,609,641 B2  
APPLICATION NO. : 11/268102  
DATED : October 27, 2009  
INVENTOR(S) : Strutt et al.

Page 1 of 1

It is certified that error appears in the above-identified patent and that said Letters Patent is hereby corrected as shown below:

ON THE FACE PAGE

1. On Page 2, in Field (56), under "FOREIGN PATENT DOCUMENTS", in Column 2, Line 4, delete "5/2008" and insert -- 5/2006 --, therefor.

IN THE SPECIFICATION

2. In Column 3, Line 35, delete "network" and insert -- network. --, therefor.

3. In Column 7, Line 55, delete "$G = L/T_d = \dfrac{Lpcr(L, R)}{t_s(L, R) + (1 - pcr(L, R)ت_e + pcr(L, R)t_w}$" and insert -- $G = L/T_d = \dfrac{Lpcr(L, R)}{t_s(L, R) + (1 - pcr(L, R)t_e + pcr(L, R)t_w)}$ --, therefor.

4. In Column 8, Line 28, delete "(such" and insert -- such --, therefor.

5. In Column 8, Line 34, delete "TLL." and insert -- TTL. --, therefor.

Signed and Sealed this  
Twentieth Day of September, 2011

David J. Kappos  
*Director of the United States Patent and Trademark Office*